(12) United States Patent
Simons

(10) Patent No.: US 6,571,899 B2
(45) Date of Patent: Jun. 3, 2003

(54) SPOKE MOUNTED DRIVE HUB FOR A CYCLE AND SYSTEM FOR PROPULSION THEREFORE

(76) Inventor: Dennis R. Simons, 3629 E. Louisiana State Dr., Kenner, LA (US) 70065

( * ) Notice: Subject to any disclaimer, the term of this patent is extended or adjusted under 35 U.S.C. 154(b) by 0 days.

(21) Appl. No.: 09/783,672

(22) Filed: Feb. 14, 2001

(65) Prior Publication Data

US 2002/0148666 A1 Oct. 17, 2002

(51) Int. Cl.$^7$ .............................................. B62K 11/00
(52) U.S. Cl. .................. 180/205; 180/220; 180/231
(58) Field of Search .............................. 180/205, 207, 180/220, 224, 231

(56) References Cited

U.S. PATENT DOCUMENTS

| | | | |
|---|---|---|---|
| 710,329 A | * 9/1902 | Marks | 180/205 |
| 752,741 A | * 2/1904 | Wilkinson | 180/205 |
| 1,410,180 A | 3/1922 | Hildebrand | |
| 1,503,935 A | * 8/1924 | Baker | 180/205 |
| 2,560,991 A | * 7/1951 | Schuricht | 180/205 |
| 2,575,873 A | 11/1951 | Henney | |
| 3,912,039 A | 10/1975 | Ordemann | |
| 3,921,745 A | * 11/1975 | McCulloch et al. | 180/220 |
| 3,966,007 A | 6/1976 | Havener et al. | |
| 4,267,898 A | * 5/1981 | Wheaton | 180/205 |
| 4,836,615 A | 6/1989 | Berg et al. | |
| 5,341,892 A | 8/1994 | Hirose | |
| 5,507,512 A | 4/1996 | Donoghue | |
| 5,893,614 A | 4/1999 | Dennis | |
| 6,011,366 A | * 1/2000 | Murakami et al. | 180/220 |
| 6,024,186 A | 2/2000 | Suga | |
| 6,347,682 B1 | * 2/2002 | Buchner | 180/220 |

FOREIGN PATENT DOCUMENTS

| | | |
|---|---|---|
| JP | 7-291175 | 11/1996 |
| JP | 7-329873 | 12/1996 |

* cited by examiner

Primary Examiner—Daniel G. DePumpo
(74) Attorney, Agent, or Firm—Joseph T. Regard Ltd.

(57) ABSTRACT

A drive hub configured to mount to the spokes of an off-the-shelf spoked wheel on a vehicle such as, for example, a bicycle, so as to allow said wheel to be driven by a motor mounted to the frame of the vehicle. The hub has an outer face including a channel or belt track for engaging a drive belt from the motor, and the inner side of the hub has formed therein spoke slots configured to accept and lock upon spokes situated on the front or rear wheel of the bicycle, and are situated such that the hub is self-centering upon installation, namely, when all of the slots are lined up to engage spokes on the bicycle, the hub is appropriately centered on said wheel. Each spoke slot is of a width so as to accept an individual spoke, with there being provided ridges, notches or the like in each slot for engaging and locking about the spoke to resist removal of the hub from the wheel, once mounted thereupon. The hub is driven by a small motor (electric or gasoline) mounted to the frame of the unit, via, for example, a friction belt drive system.

9 Claims, 5 Drawing Sheets

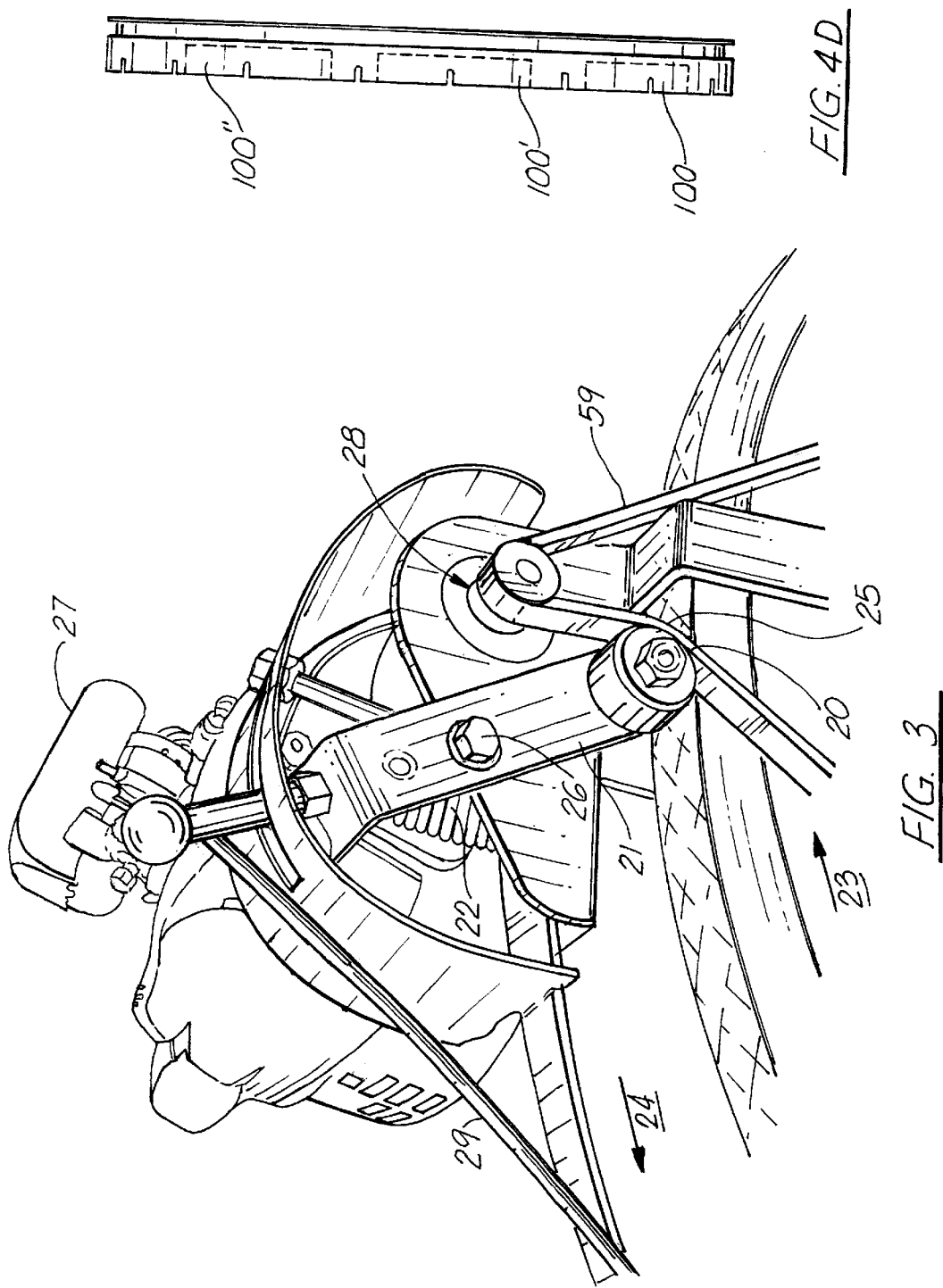

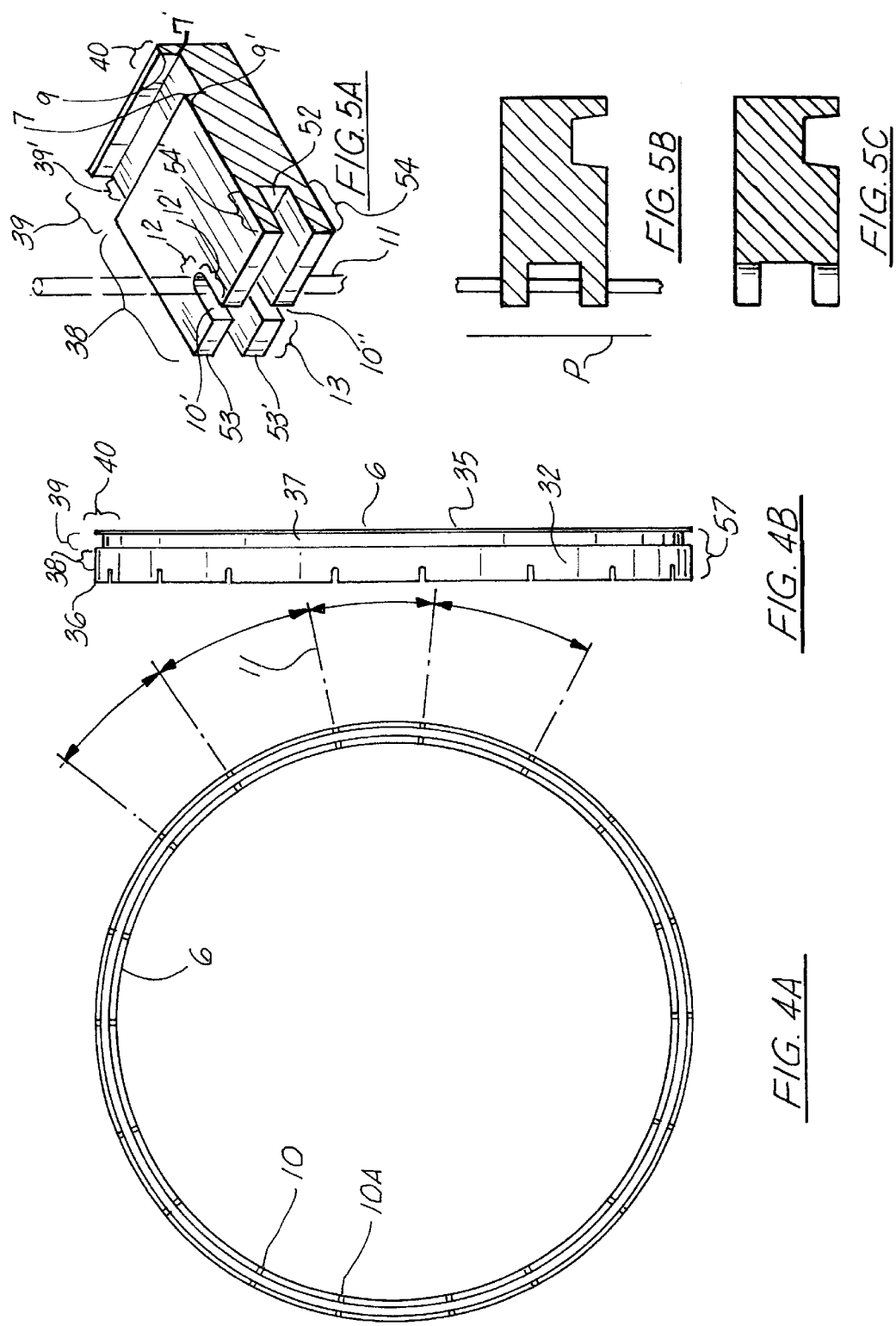

US 6,571,899 B2

SPOKE MOUNTED DRIVE HUB FOR A CYCLE AND SYSTEM FOR PROPULSION THEREFORE

TECHNICAL FIELD OF THE INVENTION

The present invention relates to drive systems for bicycles or other operator powered, wheeled vehicles, and in particular to a system for converting a bicycle having at least one spoked wheel to enable motor propulsion or assist therefore.

The preferred embodiment of the present invention teaches a spoke mounted, pulley/belt drive wherein there is provided a drive hub configured to quickly, easily, and safely mount to the spokes of an off-the-shelf spoked wheel on a vehicle such as, for example, a bicycle, so as to allow said wheel to be driven by a motor mounted to the frame of the bicycle.

With the hub of the present invention, no special tools or measurements are required for mounting the unit. The hub has an outer face having formed therein a channel or belt track for engaging a drive belt from the motor; the inner side of the hub has formed therein spoke slots configured to accept and lock upon spokes situated on the front or rear wheel of the bicycle, which slots are situated such that the hub is self-centering upon installation, namely, when all of the slots are lined up to engage spokes on the bicycle, the hub is appropriately centered on said wheel. Each spoke slot is of a width so as to accept the spoke, with there being provided ridges, notches or the like for engaging and locking about the spoke to resist removal of the hub from the wheel, once mounted thereupon.

The hub is driven by a small motor (electric or gasoline) mounted to the frame of the unit, via a friction belt drive system. The motor may be situated upon a small motor mount which is in turn bolted to the frame. The motor may be controlled by the operator via a throttle which may be situated at the handlebars and which relays the control to the motor via a throttle cable.

The system of the present invention is configured to be installed without special tools by a novice, and is designed to require no special skills for operation, installation, or maintenance.

BACKGROUND OF THE INVENTION

The prior art is replete with patents teaching various systems for motorizing bicycles and the like, wherein there is provided an internal combustion or electric motor mounted to the frame, and various drive means for linking the motor to a wheel of the vehicle. It is this linkage means which has been a weak link in prior designs in converting a user operated vehicle to a motor assist vehicle. As will be shown below, prior art linkages have include friction drives which directly engaged the tread of the wheel, as well as specialized hubs or wheels which were either complicated installation, expensive or limited in their compatibility with off-the-shelf bicycles, or unreliable in their use.

Some patents illustrating prior art systems include:

| Patent Number | Inventor | Date of Issue |
|---|---|---|
| 6024186 | Suga | Feb. 15, 2000 |
| 5893614 | Dennis | Apr. 13, 1999 |
| 5507512 | Donoghue | Apr. 16, 1996 |
| 5341892 | Hirose et al | Aug. 30, 1994 |
| 4836615 | Berg et al | Jun. 06, 1989 |
| 3966007 | Havener | Jun. 29, 1976 |
| 3912039 | Ordemann | Oct. 14, 1975 |
| 2575873 | Henney | Nov. 20, 1951 |
| 1410180 | Hildebrand | Mar. 21, 1922 |
| 731207 | Nechlediel et al | Jun. 16, 1903 |

Japan 291175 Nov. 7, 1996
Japan 329873 Dec. 19, 1996

U.S. Pat. No. 6,024,186 issued 2000 teaches an "Auxiliary Power Supply Apparatus For Bicycles" teaching a drive hub affixed to the spokes via bolts. It would appear that the hub must be somehow aligned such that the axle is centered to optimize operation of the system.

U.S. Pat. No. 3,966,007 teaches an "Electricbike" wherein there is utilized a friction wheel (122) which engages the treads of the rear wheel of the vehicle.

U.S. Pat. Nos. 2,575,873 and 731,207 teaches a motorized vehicles, each comprising a motor mounted to a bicycle frame, and drive means comprising a sprocket mounted to the axle of the rear wheel.

U.S. Pat. No. 5,341,892 teaches a vehicle having an enclosed hub which encases a motor (10) mounted about the axle.

U.S. Pat. No. 5,507,512 teaches a circular weight, configured to function as a flywheel, which is fastened to the spokes via a clip.

U.S. Pat. No. 4,836,615 teaches a disc cover which is affixed to the wheel via clip means having a slot which permits the spoke to be slipped therethrough.

U.S. Pat. No. 3,912,039 for a bicycle drive apparatus including a drive plate which "is clamped to the wheel spokes by suitable clamping devices". As indicated: "A split clamping ring 16 is then positioned adjacent the interior edges of the spokes and suitable fastening screws are used to bolt the clamping ring 16 to drive plate 15 with the wheel spokes intermediate the clamping ring and the drive plate." A friction wheel from a motor directly engages the drive plate to drive the rear wheel of the cycle.

U.S. Pat. No. 1,410,180 teaches a "motor cycle" wherein there is provided a drive hub (h) mounted to the rear wheel of the vehicle, but no mention appears to be made as to how the hub is affixed to the wheel, if it is affixed to spokes (spokes are not shown), or if it is part of a custom wheel fabrication.

U.S. Pat. No. 5,893,614 teaches a wheel covers which are screwed in place about the spokes hear the hub of the wheel.

Japanese Patents 329873 and 291175 would appear to teach a motorizing kit for a bicycle, utilizing a drive hub, U.S. Pat. No. 291175 apparently illustrating (FIG. 2) the hub apparently mounted to the spoke (FIG. 6) via a back plate (29) and screws (27). This hub would prove more difficult to install than the present invention, requiring not only additional time and the use of screws as fasteners (which could come loose and fall out when affixed to a vibrating spoke), but would appear also to require manual centering of the hub on the wheel, as well as different size hubs for different size wheels.

In summary, there would appear to be being literally dozens of patents teaching gas operated or electrical motor kits designed to interface in one manner or another with a wheel of a bicycle to drive same. Past methods have included friction wheels or rollers configured to directly engage the tread of the bicycle tire, as well as specialized hubs which replaced one of the tires. Nonetheless, the prior art would appear to have failed to have contemplated or suggested an easily mounted drive hub designed to interface with an off-the-shelf spoked wheel on a bicycle, which is inexpensive in manufacture, quickly and securely mounted to the wheel without special tools or measurements, and compatible with different sized wheels.

GENERAL SUMMARY DISCUSSION OF THE INVENTION

Unlike the prior art, the present invention provides an aftermarket motorized assist system for bicycles or the like which is easily installed by a novice, reliable in operation, inexpensive to purchase and maintain, and safe and easy to operate.

The preferred embodiment of the present invention contemplates a spoke mounted, pulley/belt assist drive system for a bicycle or the like, comprising a wheel pulley adopted to universally interface with the spokes of a bicycle wheel, the wheel pulley forming a drive hub, alternatively called a drive ring, for receiving a drive belt from a motor mounted to the frame of the bike. The drive hub has formed therethrough slots formed along a side wall, said slots configured to engage the spokes on the bike for the purpose of retaining the pulley in place on the wheel, so that the hub may be driven via a drive belt communicating with a motor mounted to the frame of the vehicle.

A belt track is formed along the outer peripheral wall of the pulley for receiving the drive belt. The belt is tensioned via a counter pulley/tension spring arrangement.

Unlike the prior art, the drive hub of the present system is quickly and easily mounted to the drive wheel of the bicycle or the like, the drive hub configured to engage spokes in forming the support for the drive wheel by securely snapping about same via spoke slots formed along an edge of the hub. The spoke slits have further formed therein ridges, notches, or the like to enable the spokes to be removably locked into place in their respective slots.

In installation, no separate step of centering is required because lining up the slots on the hub with each of the spokes effectively centers the hub as it is being installed, without tools or measurements. In contrast, other prior art systems generally required specialized tools, equipment, or training, or a custom designed vehicle for receiving the drive/assist unit.

Most bicycle wheels have 36 spokes, 18 spokes emanating from each opposing side of the axle; this arrangement is common on 24", 26" and 27" wheels. With the drive hub of the present invention, it may not be necessary that the hub engage each of the 18 spokes forming one side of the wheel. The drive hub can in fact have nine spoke slots formed so as to engage nine spokes on the wheel, and this will allow the same hub to fit different sized wheels.

It is therefore an object of the present invention to provide a drive hub which is inexpensive to manufacture and easy to install.

It is another object of the present invention to provide a drive hub which has formed therein spoke slots of a geometry and configuration so as to securely and effectively engage off-the-shelf spoked wheels of a bicycle or the like.

It is another object of the present invention to provide a motorized drive system for bicycles or the like which may be installed by a novice, and which is safe in operation.

It is another object of the present invention to provide a motorized drive system which is inexpensive in manufacture and reliable in operation.

Lastly, it is an object of the present invention to provide a method and system for converting a bicycle to provide motorized assist which is easy to operate, install, and maintain.

BRIEF DESCRIPTION OF DRAWINGS

For a further understanding of the nature and objects of the present invention, reference should be had to the following detailed description, taken in conjunction with the accompanying drawings, in which like parts are given like reference numerals, and wherein:

FIG. 3 is a side, close-up view of the drive motor and drive belt of FIG. 2, illustrating the levered idle pulley in an engaged position.

FIG. 4A is a side view of the inner edge of the drive hub of FIG. 1, illustrating the spoke slots formed therethrough.

FIG. 4B is an end view of the drive hub of FIG. 4A, illustrating the spoke slots formed through the inner edge, and the drive belt slot formed in the outer face thereof.

FIG. 4D is an end view of an alternative embodiment of the drive hub of FIG. 4A.

FIG. 5A is an isometric, cut-away view of a portion of the drive hub mounted about an exemplary spoke.

FIGS. 5B and 5C illustrate cross-sectional views of the drive hub of FIG. 5A.

DETAILED DISCUSSION OF THE INVENTION

Figure 1:
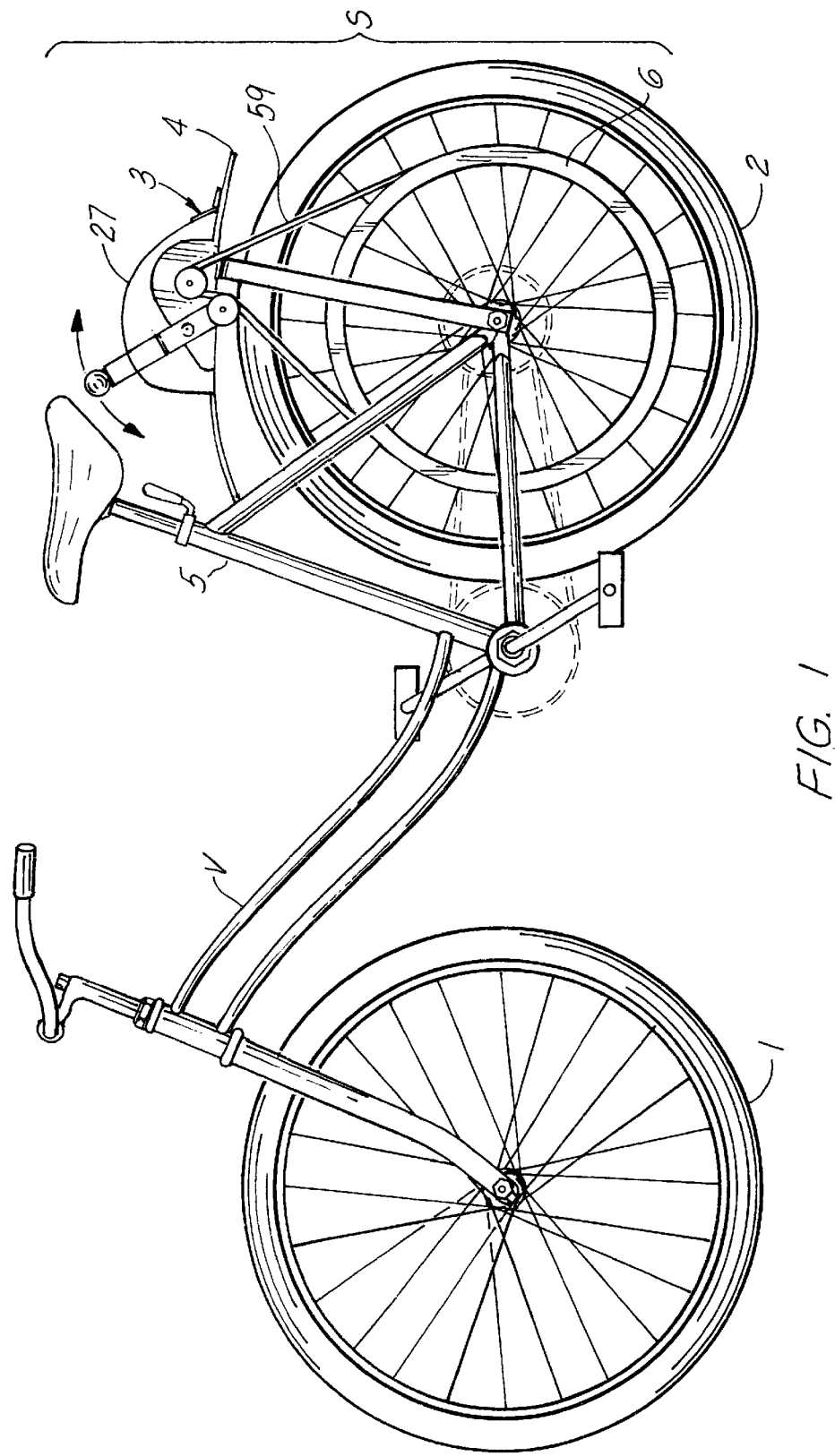
FIG. 1 is a side, overall view of the preferred embodiment of the system of the present invention, illustrating the drive hub mounted to the rear wheel of a bicycle, as well as a drive motor therefore.

Continuing with FIG. 1 of the drawings, the system S of the present invention is configured to motorize a wheeled vehicle V, the preferred embodiment of the present invention configured to be utilized in conjunction with a bicycle having front 1 and rear 2 wheels.

A motor unit 3, which includes a motor 27 (electric, internal combustion, etc) affixed to a motor mount 4 is mounted to the frame 5 of the vehicle, drives a drive hub 6, the drive hub being mounted to the spokes 8 of either the rear 2 or front 1 wheels via drive belt 59.

FIG. 1 illustrates the motor mount configuration as it would be implemented for driving the rear wheel of the cycle, but it is noted that the location of the motor can vary depending upon the type and application. Generally, the motor should be mounted in the vicinity of the wheel which is being driven, so if the front wheel of the cycle were to be driven utilizing the present invention, the motor should generally be mounted in the vicinity of the front wheel.

Continuing with FIGS. 2, 4A–4*b* and 5A–5C, a unique innovation which sets the present invention apart from the prior art is the drive hub 6. As shown, the hub is of a cylindrical configuration, having an inner 31 and outer 32 walls, a width 57, and inner 36 and outer 35 edges, the outer wall 32 having a slot 37 spaced 38 from inner edge 36, the slot 37 having a width 39 and depth 40 sufficient to accommodate and frictionally engage the drive belt. Ideally, the opposing top edges 9, 9' forming the slot have a slight radial, and the width 39 at the top 7 of the slot is ideally wider (example ⅜" width) than the bottom 7' (example 5/16"), so as to accommodate a belt with similar cross-sectional dimensions. The drive hub may be formed of, for example, polyvinyl chloride or polyethylene plastic or the like, each of which provides a strong, resilient material.

As shown, the typical spoked wheel 2 comprises a wheel hub 41 which is supported in its center by an axle 42 having first 43 and second 44 ends having first 45 and second sets of spokes 46 emanating therefrom, respectively, each of said sets of spokes situated in opposing, geometrically frustoconical planes, each set of spokes terminating along the inner wall 47 of rim 48 so as to support tire 49.

The drive hub of the present invention is configured to engage the spokes 11 of the wheel 2 via a series of spoke slots 10, 10A formed in the inner edge 36 about the periphery of the drive hub 6 in spaced relationship about the circumference of the wheel rim 48, each spoke slot formed to engage a spoke on the wheel. Each slot has a width 12, length 12' and depth 13 configured to securely engage a spoke on the wheel, the preferred embodiment configured to engage each of the spokes forming one of either the first 45 or second 46 sets of spokes, depending upon whether the hub is situated adjacent to first 50 or second 51 side of the wheel. Generally, the hub would be installed on the side of the wheel opposite that having the gears and chain situated adjacent to, in order to avoid interference with the bicycle when it is manually pedaled. By having the spoke slots formed into the hub, the act of aligning the slots with the respective spokes to be engaged effectively centers the drive hub with regard to the axle and the wheel.

The preferred embodiment has formed in the inner edge 36 of the drive hub a circumferential channel 52, so as to form outer 53 and inner 53' spoke engagement members, each member having formed therein the spoke slots 10', 10", respectively. Because each of the spokes is at an angle (for example, about 5 degrees for a 27" wheel) the inner edge of the drive hub, as well as to a plane P slicing laterally through the center of the wheel rim to the mid-point of the axle 42 (the angle due to the spokes emanating from a side of the axle and terminating along a common central portion of the hub), the spoke slot 10" at the inner spoke engagement member 53' may accommodate the engaging spoke 11 at a slightly greater depth 54 than the depth 54' of the spoke 11 at the spoke slot 10' in the upper engagement member 53.

The spoke engagement members for the illustrated hub extend about 5/16", or alternatively, the circumferential channel 52 is 5/16" deep and about ⅜" wide for the present hub, which is mounted to a 26" wheel. The rear hub of the preferred embodiment of the present invention has a diameter of 18", although a rim may be likewise made larger or smaller, and a 16" rim can likewise be functional.

Further, while the illustrated embodiment of the hub is configured to engage only one of the first 45 or second 46 sets of spokes, a hub could be configured to engage both sets of spokes, if desired. It has been found, however, that it is only necessary to engage one side of the tire, and engaging only one of the first 45 or second 46 sets of spokes allows the drive hub to be of lesser diameter and width, as well as being easier to install.

Figure 4C:
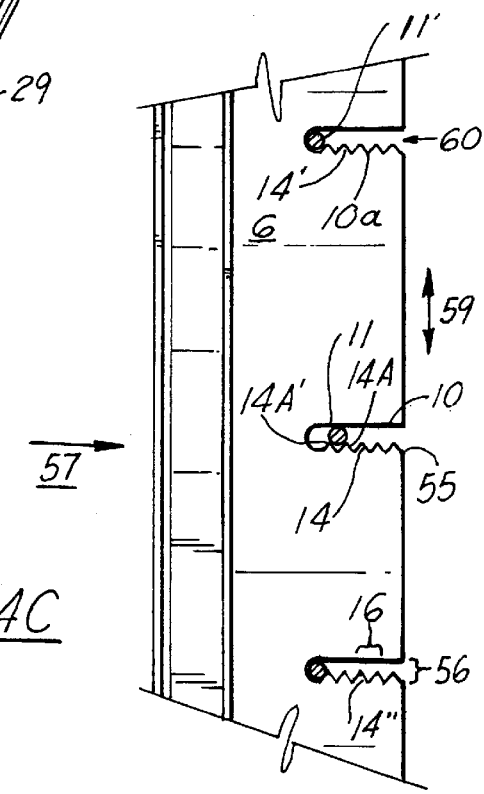
FIG. 4C is a close-up view of the drive belt of FIG. 4C, illustrating spokes locked into said spoke slots, and ridges and notches formed in the spoke slots for facilitating locking of the spokes therein.

Continuing with FIG. 4C, each spoke slot 10 has formed in at least one side wall 55 one or more notches 14, 14', 14" formed by ridges 14A, 14A' each ridge having an amplitude 56 and width 16 to securely engage a spoke 11 by aligning 59' the drive hub 6 so that each slot 10, 10a is aligned with a respective spoke 11, 11', and urging 57 the drive hub toward the aligned spokes, so as to urge 60 each spoke within each respectively aligned slot and so as to engage the notches, until the hub rests generally against the spokes forming the side of the wheel. As indicated, the exemplary embodiment of the present invention is formed of polyvinyl chloride (PVC) plastic, which allows for the ridges to "give" as the spokes are inserted through the spoke slot, the plastic material retaining a memory which urges the notches formed by the ridges tightly about the spoke, retaining the disk in a secure, but removable, fashion.

It is noted that notches may be formed in the spoke slot without ridges, and other configuration ridges/notches, or locking geometries formed in the spoke slots may likewise prove satisfactory, and that the illustrated ridge and notch designs are for exemplary purposes only, and the innovation in the present invention relates not only to the use of ridges and/or notches in combination with a spoke slot to retain the drive hub in place, but also the innovation of forming a geometry in the spoke slot(s) to removably lock the hub in place vis a vis the spokes.

Because the ridges and notches have been pre-measured to fit the spokes of the wheel, the act of aligning the slots with the spokes effectively centers the drive hub with regard to the axle and hub of the wheel, dispensing with the need for complicated and time consuming measurements or calculations. As shown in FIG. 4D, in an alternative embodiment, spaces 100, 100', 100" may be formed (in the area shown in phantom] to facilitate connection of the hub via only nine spaced spoke slots, so as to allow the hub to be utilized with different sized wheels, for example, the same hub (example 15" hub) utilized with 24 and 26 inch wheels.

Figure 6:
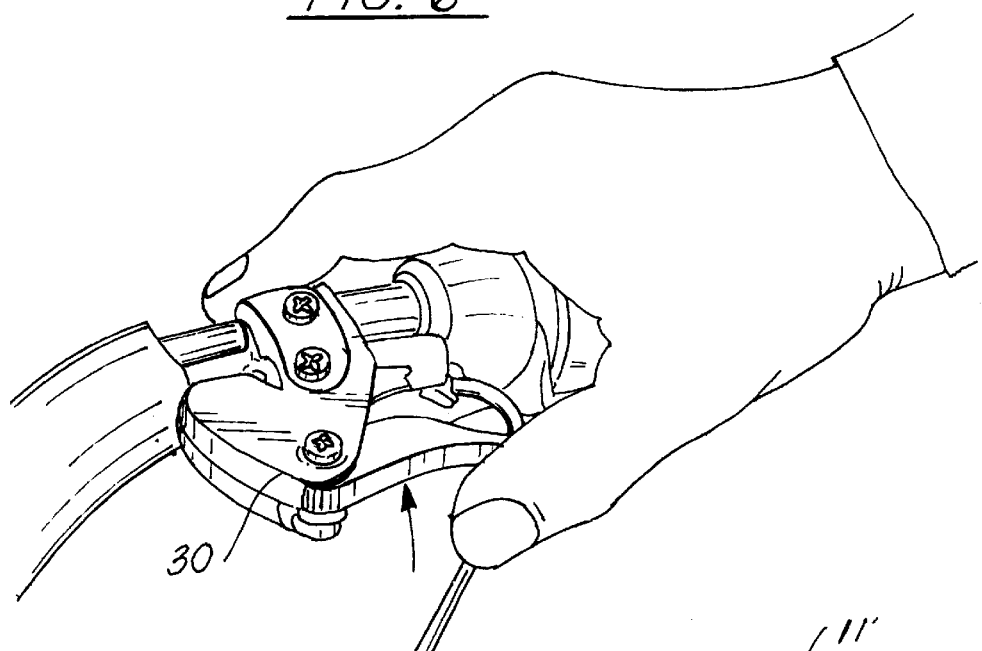
FIG. 6 is an isometric view of an operator operating an exemplary handlebar mounted throttle for the invention of FIG. 1.

Continuing with FIG. 3, the motor 27 of the exemplary embodiment of the invention is a ¾ horsepower (HP) engine as is used in line trimmers and the like and manufactured and/or sold under the brand names KORTZ, ECHO, HOMELITE, TML, and are found as 20–24 ccs, solid state 2 stroke, and some larger engines are also available (example, 26 cc, about 2 HP). The engines performance varies with the make, most providing high mileage (about 360 miles/gallon) and relatively quiet performance (less than 30 DB's wide open" at a top speed on flat terrain of about 30 mph. A throttle 30 (FIG. 6) mounted to the handlebars is engaged by the user, a throttle cable 29 (FIGS. 3 and 6) controlling the motor.

The shaft 28 of the engine engages the belt 59, an idle pulley 20 (for example ¾"-1") controlling belt tension 25 to activate or deactivate the engagement of the motor to the drive hub. A lever 21 is pivots 26 to engage 23 or disengage 24 the belt tension 25 via the idle pulley 20, the tension on the belt drive when engaged being about 20–25 pounds, and is provided by a bias spring 22. The lever 21 may be actuated by the user via a lever having a knob thereon, for hand initiated engagement or disengagement. Upon engagement, the idle pully not only increases the belt tension to drive the drive hub, it also increases the surface contact of the drive belt about the drive hub and drive pulley shaft.

Figure 2:
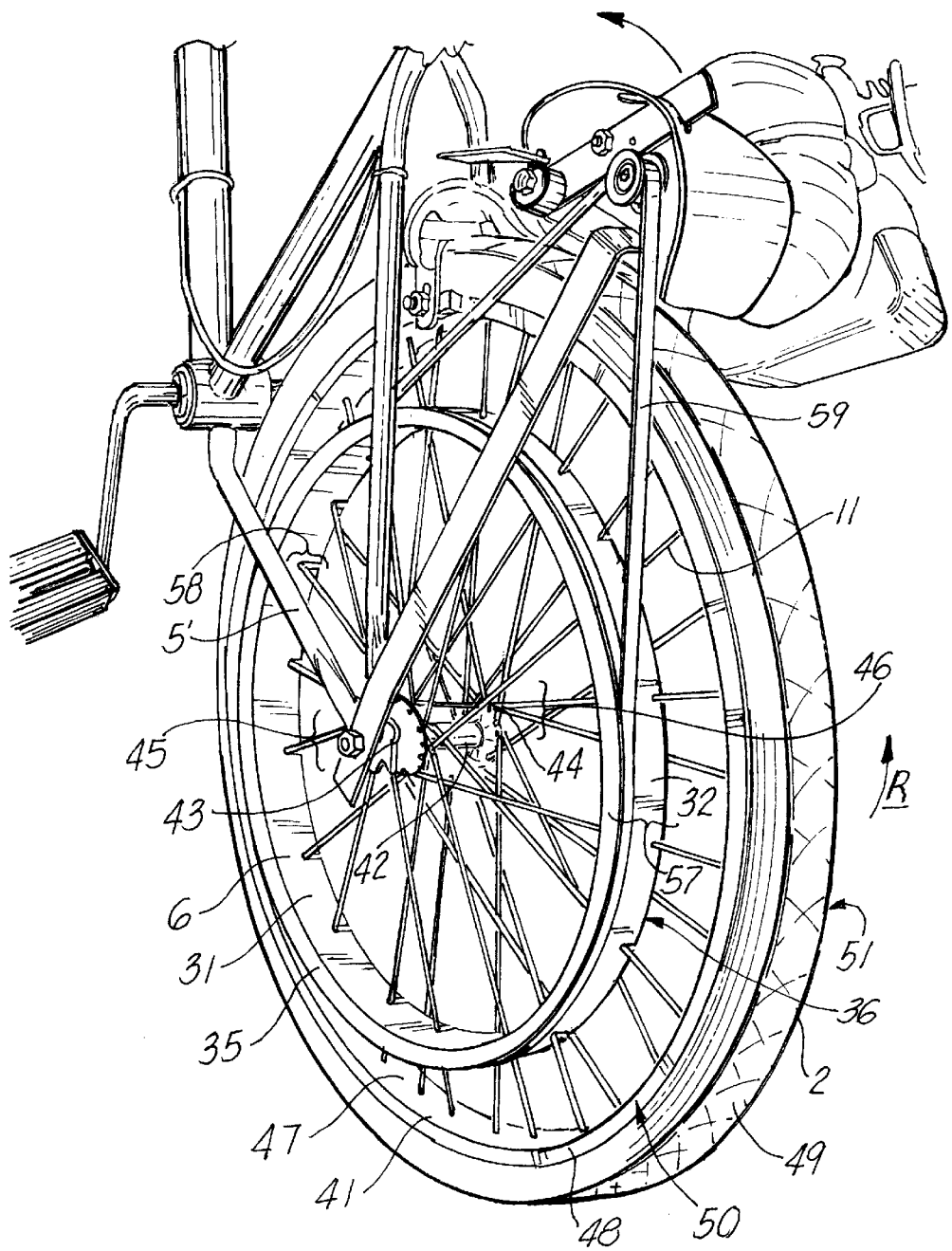
FIG. 2 is a side, upper, isometric view of the drive hub, drive motor, and drive belt of FIG. 1, further illustrating the engagement/disengagement mechanism in the form of a levered idle pulley, shown in a disengaged position.

As shown in FIG. 2, once the drive hub is mounted to the spokes, it is important that the width 57 of the drive hub 6 fits within the space 58 between the frame member 5 and the spokes 11 forming the wheel, to insure free and unencumbered rotation R of the wheel and the hub.

In summary, a preferred embodiment of the method of the present invention may comprise, for example, the method of transmitting power from a motor to a vehicle having a wheel having spokes, comprising the steps of:

a. providing a drive hub having first and second edges, an inner wall, an outer wall, a diameter, a circumference, and a width, said first edge of said drive hub having formed laterally therein a plurality of spoke slots, each said spoke slots having a width, each of said spoke slots spaced and situated so as to receive a single spoke therein, respectively, each of said spoke slots having situated therein first and second ridges having an amplitude so as to narrow said width of each of said spoke slots, and a notch formed therebetween so as to engage and removably retain said spokes situated within said spoke slots, so as to engage and removeably retain said drive hub to said wheel;

b. aligning said spoke slots formed in said first edge of said drive hub with each of said first set of spokes on said wheel;

d. applying pressure to said drive hub so that each of said spoke slots has a spoke aligned therewith, providing aligned spokes;

e. allowing said positioning of said aligned spokes with respective slots to center said hub on said wheel;

f. applying pressure to said hub to urge said aligned spokes within said spoke slots; while g. allowing said ridges situated within said slots to removeably retain said drive hub to said wheel.

The invention embodiments herein described are done so in detail for exemplary purposes only, and may be subject to many different variations in design, structure, application and operation methodology. Thus, the detailed disclosures therein should be interpreted in an illustrative, exemplary manner, and not in a limited sense.

What is claimed is:

1. An apparatus for providing propulsion to a vehicle, comprising:

a wheel, said wheel having an axle having first and second ends, said first and second ends of said axle corresponding to first and second sides of said wheel, a first set of spokes having first and second ends, a second set of spokes having first and second ends, and a rim, said first end of said first set of spokes affixed to said first end of said axle, said second end of said first set of spokes affixed to said rim, said first end of said second set of spokes affixed to said second end of said axle, said second end of said second set of spokes affixed to said rim;

a drive hub having first and second edges, an inner wall, an outer wall, a diameter, and a circumference, said first edge of said drive hub having formed laterally therein first and second spoke slots having a width, said first and second spoke slots spaced and situated so as to each receive one of said spokes comprising said first set of spokes, providing engaged spokes, each of said first and second spoke slots having situated therein first (14A) and second (14A') ridges having an amplitude (56) so as to narrow said width of each of said spoke slots, so as to form a notch (14) between each of said first and second ridges, said notch adapted to engage and removably retain one of said spokes, so as to engage and removably retain said drive hub to said second side of said wheel; and drive means for driving said drive hub.

2. The apparatus of claim 1, wherein said drive hub has formed along its outer wall a belt track, and wherein said drive means comprises a motor having a shaft, and wherein there is further provided a belt situated along said belt track, said belt further communicating with said shaft.

3. The apparatus of claim 2, wherein said vehicle comprises a bicycle having a frame, and wherein said apparatus comprises a motor mount affixed to the frame of said bicycle, said motor mount having a motor situated thereupon, said motor having a shaft, and wherein there is further provided a drive belt engaged to said shaft, said drive belt further engaged to said drive hub.

4. The Apparatus of claim 3, wherein there is further provided an engagement lever associated with said motor, said engagement motor having an idle pulley thereupon, said engagement lever pivotally situated so as to provided tension to said drive belt upon said demand.

5. The apparatus of claim 4, wherein said first edge of said drive hub has formed therein circumferential channel so as to provide first and second spoke engagement members, each member having formed therein said first and second spoke slots and said notch, respectively.

6. An apparatus for transmitting propulsion to a vehicle having a wheel having first and second spokes, comprising:

a drive hub having first and second edges, an inner wall, an outer wall, a diameter, a circumference, and a width, said first edge of said drive hub having formed laterally therein a plurality of spoke slots, each said spoke slots having a width, each of said spoke slots spaced and situated so as to receive a single spoke therein, respectively, each of said spoke slots having situated therein retaining means for removably locking said drive hub to said wheel, said retaining means comprising a notch formed in each of said spoke slots adapted to snap about and thereby engage and removably lock a spoke situated in said spoke slot, while engaging and removably retaining said drive hub to said wheel;

wherein each of said spoke slots has a length, and wherein each of said spoke slots has formed therein a plurality of notches for receiving and engaging a spoke along the length of said each of said spoke slots.

7. The apparatus of claim 6, wherein said retaining means further comprises a ridge situated adjacent to said notch, said ridge having an amplitude narrowing the width of each of said spoke slots.

8. The apparatus of claim 7, wherein said drive hub has formed along its outer wail a belt track for receiving a drive belt from a motor.

9. The apparatus of claim 8, wherein said hub has formed therein a space (100) between each of said spoke slots, said space configured to allow the passage of a spoke therethrough such that said spoke does not contact said hub.

* * * * *